United States Patent
Tsirkin

(10) Patent No.: US 10,372,608 B2
(45) Date of Patent: Aug. 6, 2019

(54) SPLIT HEAD INVALIDATION FOR CONSUMER BATCHING IN POINTER RINGS

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 110 days.

(21) Appl. No.: 15/691,100

(22) Filed: Aug. 30, 2017

(65) Prior Publication Data
US 2019/0065371 A1 Feb. 28, 2019

(51) Int. Cl.
*G06F 12/08* (2016.01)
*G06F 12/0808* (2016.01)
*G06F 12/0868* (2016.01)
*G06F 9/455* (2018.01)

(52) U.S. Cl.
CPC ...... *G06F 12/0808* (2013.01); *G06F 9/45558* (2013.01); *G06F 12/0868* (2013.01); *G06F 2009/45583* (2013.01); *G06F 2212/224* (2013.01); *G06F 2212/621* (2013.01)

(58) Field of Classification Search
CPC .... G06F 12/0808; G06F 3/0619; G06F 3/065; G06F 3/067; G06F 9/45558; G06F 12/0868; G06F 2009/45583; G06F 2212/224; G06F 2212/621
See application file for complete search history.

(56) References Cited

U.S. PATENT DOCUMENTS

| | | | |
|---|---|---|---|
| 7,113,985 B2 | 9/2006 | Narad et al. | |
| 8,345,540 B2 | 1/2013 | Rollins | |
| 8,667,187 B2 | 3/2014 | Thakkar | |
| 9,678,866 B1 | 6/2017 | Stark | |
| 2006/0236011 A1 | 10/2006 | Narad et al. | |
| 2007/0245074 A1* | 10/2007 | Rosenbluth | G06F 5/10 711/110 |

(Continued)

OTHER PUBLICATIONS

Rahul Sharma; User space Network Protocol Stack for NFV based on NETMAP; Department of Computer Science and Engineering, Indian Institute of Technology Bombay, Mumbai (India); Oct. 14, 2016; 34 pages.

(Continued)

*Primary Examiner* — Reginald G Bragdon
*Assistant Examiner* — Edward Wang
(74) *Attorney, Agent, or Firm* — K&L Gates LLP

(57) ABSTRACT

A split head invalidation system includes a first memory including a ring buffer, a second memory, and a processor in communication with the first memory. The processor includes a consumer processor and a producer processor. The consumer processor is configured to maintain a head and tail pointer, detect a request to copy a memory entry from the ring buffer, and consume the memory entry. Consuming the memory entry includes iteratively testing a value associated with the memory entry in a slot indicated by the head pointer, retrieving the respective memory entry from the slot, and advancing the head pointer to the next slot until reaching a threshold quantity of slots. Additionally, the consumer processor is configured to invalidate each slot from the head pointer to the tail pointer after reaching the threshold quantity.

20 Claims, 8 Drawing Sheets

(56) References Cited

U.S. PATENT DOCUMENTS

2008/0104325 A1* 5/2008 Narad ................ G06F 12/0862
    711/122
2016/0380848 A1    12/2016 Raney
2017/0063733 A1    3/2017  Lawson et al.

OTHER PUBLICATIONS

Jinho Hwang, K.K. Ramakrishnan, and Timothy Wood; NetVM: High Performance and Flexible Networking using Virtualization on Commodity Platforms; The George Washington University, WINLAB, Rutgers University, 2015, 14 pages.
Paul Barham, Boris Dragovic, Keir Fraser, Steven Hand, Tim Harris, Alex Ho, Rolf Neugebauer, Ian Pratt, and Andrew Warfield; Xen and the Art of Virtualization; University of Cambridge Computer Laboratory; Oct. 19-20, 2003; 14 pages.

* cited by examiner

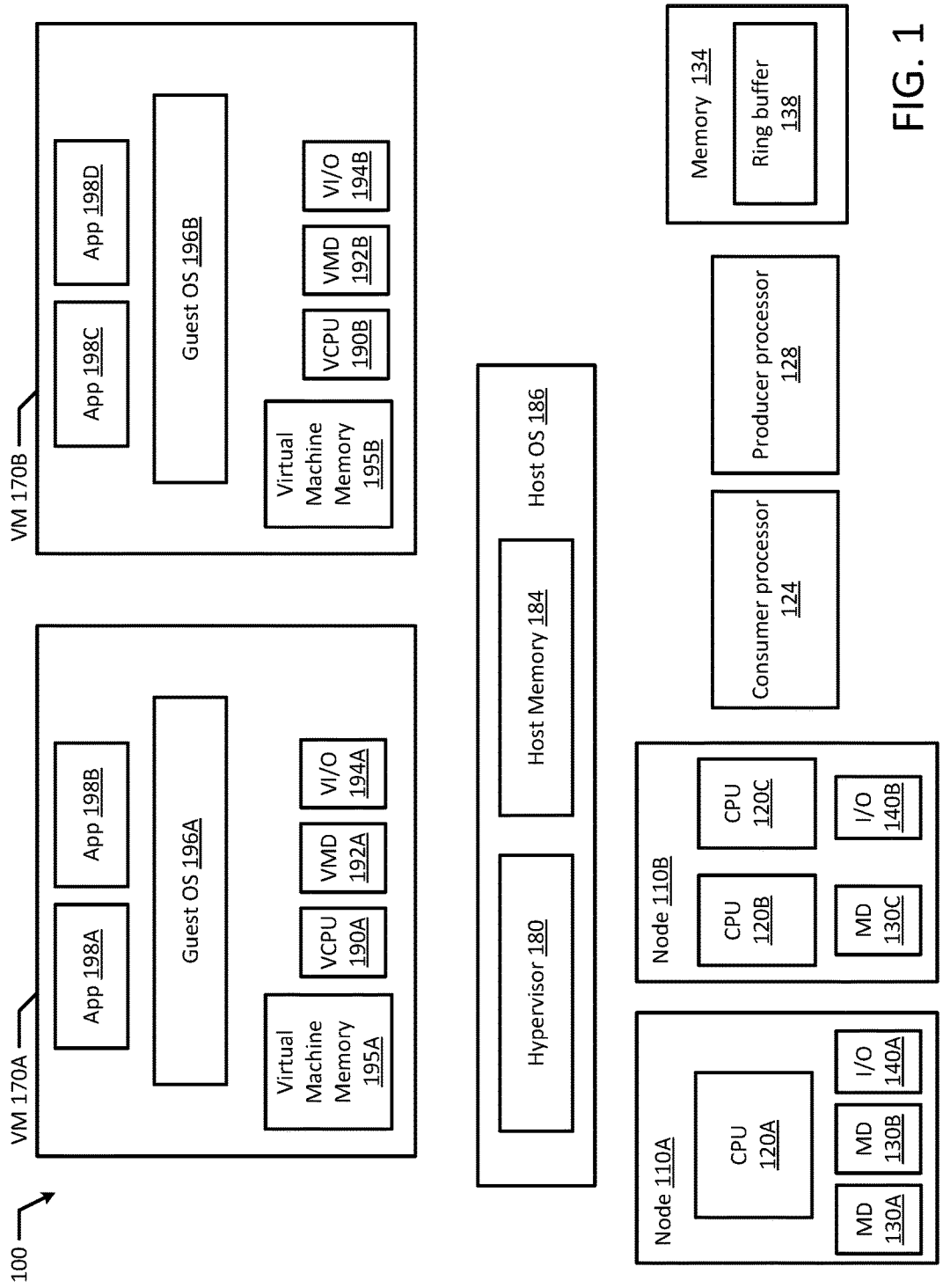

US 10,372,608 B2

SPLIT HEAD INVALIDATION FOR CONSUMER BATCHING IN POINTER RINGS

BACKGROUND

Computer systems may routinely copy memory entries from one memory to a different memory. For example, while forwarding incoming networking traffic to a physical or virtual machine, packets may be received and later copied to another memory location. Processors may execute instructions to read, write, and copy memory entries, such as packet addresses to forward networking traffic to different machines. For example, memory entries may be temporarily stored in ring buffers on a first-in-first-out basis before being copied to the memory associated with a different machine. Specifically, incoming networking traffic may be stored on a ring buffer and later copied to virtual machine memory.

SUMMARY

The present disclosure provides new and innovative systems and methods for reverse slot invalidation for pointer rings. In an example, a system includes a first memory including a ring buffer having a plurality of slots, a second memory, and at least one processor in communication with the first memory. The at least one processor includes a consumer processor and a producer processor. The consumer processor is configured to maintain a head pointer and a tail pointer, detect a request to copy at least one memory entry from the ring buffer to the second memory, and consume the at least one memory entry from the ring buffer. Consuming the at least one memory entry includes testing a respective value associated with a respective memory entry in a first slot of the plurality of slots, where the first slot is indicated by the head pointer, and responsive to receiving a valid value from the test, retrieving the respective memory entry from the first slot. Additionally, consuming the at least one memory entry includes advancing the head pointer to a second slot while the location of the tail pointer remains unchanged, iteratively repeating the testing, retrieving, and advancing for each successive slot that the head pointer advances to until reaching a threshold quantity of slots. Then, responsive to a quantity of slots reaching the threshold quantity of slots, the consumer processor is configured to invalidate each slot between the head pointer and the tail pointer.

In an example, a method includes maintaining, by a consumer processor, a head pointer and a tail pointer. Additionally, the consumer processor detects a request to copy at least one memory entry from a ring buffer having a plurality of slots, and consumes the at least one memory entry from the ring buffer. Consuming the at least one memory entry includes testing a respective value associated with a respective memory entry in a first slot of the plurality of slots, where the first slot is indicated by the head pointer, and responsive to receiving a valid value from the test, retrieving the respective memory entry from the first slot. Additionally, consuming the at least one memory entry includes advancing the head pointer to a second slot while the location of the tail pointer remains unchanged, iteratively repeating the testing, retrieving, and advancing for each successive slot that the head pointer advances to until reaching a threshold quantity of slots. Then, responsive to a quantity of slots reaching the threshold quantity of slots, the consumer processor invalidates each slot between the head pointer and the tail pointer.

In an example, a non-transitory machine-readable medium stores code, which when executed by a consumer processor, is configured to maintain a head pointer and a tail pointer, detect a request to copy a at least one memory entry from a ring buffer having a plurality of slots, and consume, by the consumer processor, the at least one memory entry from the ring buffer. Consuming the at least one memory entry includes testing a first value associated with a respective memory entry in a first slot of the plurality of slots, where the first slot is indicated by the head pointer. Consuming the at least one memory entry further includes responsive to receiving a valid value from the test, retrieving the respective memory entry from the first slot. Additionally, consuming the at least one memory entry includes advancing the head pointer to a second slot while the location of the tail pointer remains unchanged, iteratively repeating the testing, retrieving and advancing for each successive slot that the head pointer advances to until reaching a threshold quantity of slots. Additionally, the non-transitory machine-readable medium is configured to invalidate each slot between the head pointer and the tail pointer responsive to a quantity of slots reaching the threshold quantity of slots.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIG. 1 illustrates a block diagram of an example computing system according to an example embodiment of the present disclosure.

DETAILED DESCRIPTION OF EXAMPLE EMBODIMENTS

Figure 2A:
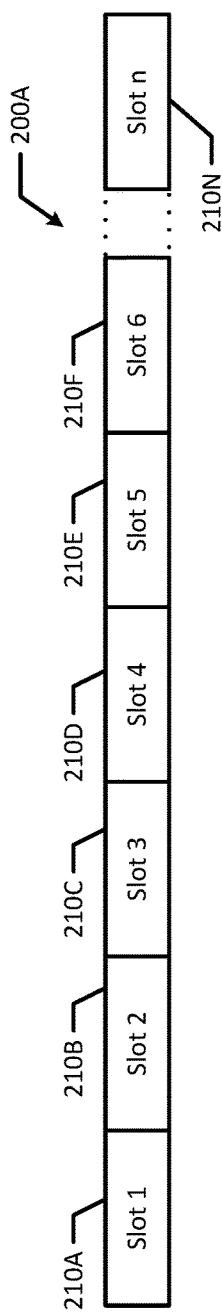
FIG. 2A illustrates a block diagram of an example memory ring according to an example embodiment of the present disclosure.

Techniques are disclosed for reverse slot invalidation for pointer rings when copying data from one memory location (e.g., ring buffer) to a different memory. For example, the techniques disclosed may be used when forwarding incoming network traffic to a virtual machine by a hypervisor, which may include receiving a packet from a network interface controller (NIC) in hypervisor memory and copying the packet to virtual machine memory. The act of receiving the data (e.g., packets) and copying the data may be executed on the same processor (e.g., CPU), however, parallelizing the actions on separate processors or separate processor cores may provide significant performance advantages. Currently, techniques of parallelizing the receiving and copying may involve a first CPU receiving an interrupt from a NIC, receiving packets from the NIC, and adding the packets to a list in a shared memory. A second CPU runs a thread to retrieve the packets from the list and copy the packets to VM memory. Because the parallel process utilizes two CPUs, the process adds additional overhead because adding and removing packets on one list requires cross-CPU communication through shared memory. Traditionally, a linked list or a producer/consumer ring was used without much added performance as false cache sharing typically outweighed the benefits of parallelism.

Additionally, other approaches such as a typical circular buffer design often creates cache line bounces between the two CPUs. For example, a ring data structure (e.g., an array with a plurality of slots) may be used with a producer processor and a consumer processor (or producer CPU and consumer CPU). In the disclosed implementation, an interrupt handling processor or producer processor may maintain a producer pointer. The producer pointer may store data, such as the address of each packet received at the slot addressed by the producer pointer. The producer processor may increment the pointer to address the next slot, thereby wrapping around at the end of the array. To avoid overruns, before storing the data (e.g., the address of each packet and/or packet), the producer processor may test the value in each slot. If the value is valid (e.g., non-NULL), the data is not stored in the list and may be discarded. A data copying processor or consumer processor may maintain a consumer pointer. The consumer processor may test the value pointed to by the consumer pointer. If the value is invalid (e.g., NULL), then the array is empty and the consumer processor may stop and wait for more packets. If the value is valid (e.g., non-NULL), the consumer processor may retrieve the data, such as a packet address. Then, the consumer processor may invalidate the slot (e.g., write NULL into the slot) and may advance the consumer pointer to the next slot. The retrieved data may be copied to a second memory location (e.g., virtual machine memory).

Invalidating a slot (e.g., storing a NULL value in a slot) advantageously allows reuse of the slot for additional data (e.g., forwarding a new packet). However, this data structure may experience performance bottlenecks. For example, when a driver is highly optimized, copying may be slower than receiving packets. Thus, writing an invalid (e.g., NULL) value by the copying thread or consumer processor may cause cache invalidation messages to be sent to the interrupt handling thread or producer processor. Additionally, the consumer processor may be blocked from consuming additional memory entries until each of the invalidation messages is received. As a result, the ring may be full for a large part of the time, and as each packet slot is invalidated by the consumer processor, the packet slot may be immediately made valid again by the interrupt handling processor or producer processor, which may cause a cache line to bounce between the processors and results in a significant slowdown. Due to the bottleneck and resulting slowdown from cache line bounces and waiting for cache invalidation messages to be received, the consumer processor may be unable to get ahead of the producer processor resulting in cache line bounces for each data operation in the ring buffer.

A proposed solution to the cache line bounces and the blockage of consumer processor described above was to load a network interface controller (NIC) driver in a virtual machine as a pass-through to avoid the need for packet forwarding. However, this approach breaks migration and overcommit, which may cause the host or computer system to crash. Additionally, even though consuming multiple memory entries or packets at once may cause a single invalidation, such batching may require waiting for multiple packets to become available through receive coalescing or rx coalescing, which may increase latency and add overhead for running timers on the host. For example, rx coalescing may wait a predetermined amount of time before raising an rx interrupt after a memory entry or packet has been received. Similarly, rx coalescing may involve waiting for a specified number of memory entries or packets to queue up before raising an rx interrupt. Further, this proposed solution may require an updated application program interface (API) to enable the consumer processor to consume multiple packets at a time, which may only be beneficial if multiple packets are available. For example, the proposed solution of loading a NIC driver in a virtual machine as a pass-through (e.g., with rx coalescing) may cause delays while waiting for additional packets and may result in additional overhead as a result of using a complex consumer processor.

Another proposed solution to the cache line bounces described above was to reserve extra slots in the ring, which would remain unused to space out the producer thread and consumer thread such that they were not accessing the same cache line. However, ring size is often designed in powers of two to allow optimization. If a ring with 128 active slots is needed, then by adding unused slots, the implemented ring would be designed with 256 slots (e.g., next power of two above 128 slots). For example, if 128 active slots will be utilized, and 10 slots will remain unused, then the ring needs a minimum of 138 slots. Due to the common practice of increasing ring buffer size by a factor of two, the next logical ring buffer size is 256 slots (e.g., next largest size up from 128 slots). However, larger rings are problematic because the processors keep watch over the ring, and a larger ring puts more pressure on cache. Moreover, only actively using, for example, 128 slots of 256 slots is not an efficient use of hardware resources.

As described in the various example embodiments disclosed herein, to reduce the frequency of cache line bounces and prevent slowdown while waiting for cache invalidation messages to be received, the consumer processor maintains a head pointer and a tail pointer and detects a request to copy one or more memory entries (e.g., data such as packet addresses) from a ring buffer. The consumer processor consumes the memory entries by testing values associated with the respective memory entries in successive slots in the ring buffer. If the consumer processor receives a valid value from the test, the consumer processor retrieves the respective memory entry from the slot. After retrieving the memory entry, the consumer processor advances to the head pointer to the next successive slot and continues to test and retrieve memory entries from successive slots until the head pointer advances to a threshold quantity of slots (thereby retrieving a threshold quantity of memory entries). In an example, the consumer processor may copy the respective memory entries to a second memory and may track a quantity of slots that the head pointer advances to. Once the quantity of slots reaches the threshold quantity of slots, the consumer processor invalidates each slot between the head pointer and the tail pointer, for example by invaliding slots from the head pointer all the way back to and including the tail pointer. For example, the consumer processor may walk the ring buffer backwards from the current location of the head pointer to the first slot (e.g., original location of the head pointer) and may invalidate each of the slots while walking backwards. Due to invalidating slots in groups, the producer processor is held back and only starts adding new entries in the ring after the consumer processor has made progress. Thus, the consumer processor may advantageously retrieve a group of packets elsewhere in the ring (e.g., a few slots ahead of the producer processor) such that retrieving a single packet no longer causes cache line bounces between the producer processor and consumer processor even when the ring is full or almost full. Additionally, invalidating the slots in groups may advantageously reduce the quantity of cache invalidation messages to be sent to the interrupt handling thread or producer processor, thereby reducing the occurrence of the consumer processor being blocked while waiting for the producer processor to receive each of the cache invalidation messages. Thus, cache line bounces and consumer processor blockage events are advantageously reduced and performance is improved. For example, the above consumer processor modification may improve packet throughput by approximately ten percent or more.

Instead of the cache line constantly bouncing between the producer processor and consumer processor, the consumer processor retrieves and invalidates a threshold quantity of memory entries at a time, which advantageously allows the consumer processor to retrieve multiple memory entries before the cache line bounces to the producer processor and before sending an invalidation messages to the producer processor, thereby improving performance and throughput without doubling the ring size as described above.

FIG. 1 depicts a high-level component diagram of an example computing system 100 in accordance with one or more aspects of the present disclosure. The computing system 100 may include an operating system (e.g., host OS 186), one or more virtual machines (VM 170A-B), nodes (e.g., nodes 110A-B), a consumer processor 124, a producer processor 128, and memory 134 including a ring buffer 138. Ring buffer 138 may be a data structure using a single, fixed-size buffer as if it were connected end-to-end (e.g., in a ring). In an example, the ring buffer 138 may be a first-in-first-out (FIFO) data structure. For example, memory entries such as packet addresses may be written into and retrieved from the ring buffer 138. Additionally, the ring buffer 138 may have a plurality of slots, which may store memory entries. The slots may be tracked by pointers or indices, such as a head pointer and a tail pointer. In an example, the consumer processor 124 may maintain the head pointer and the tail pointer.

Virtual machines 170A-B may include a guest OS, guest memory, a virtual CPU (VCPU), virtual memory devices (VIVID), and virtual input/output devices (VI/O). For example, virtual machine 170A may include guest OS 196A, guest memory or virtual machine memory 195A, a virtual CPU 190A, a virtual memory devices 192A, and virtual input/output device 194A. Virtual machine memory 195A may include one or more memory pages. Similarly, virtual machine 170B may include guest OS 196B, virtual machine memory 195B, a virtual CPU 190B, a virtual memory devices 192B, and virtual input/output device 194B. Virtual machine memory 195B may include one or more memory pages.

The computing system 100 may also include a hypervisor 180 and host memory 194. Hypervisor 180 may manage host memory 184 for the host operating system 186 as well as memory allocated to the virtual machines 170A-B and guest operating systems 196A-B such as guest memory or virtual machine memory 195A-B provided to guest OS 196A-B. Host memory 184 and virtual machine memory 195A-B may be divided into a plurality of memory pages that are managed by the hypervisor 180. Virtual machine memory 195A-B allocated to the guest OS 196A-B may be mapped from host memory 184 such that when a guest application 198A-D uses or accesses a memory page of virtual machine memory 195A-B, the guest application 198A-D is actually using or accessing host memory 184.

In an example, a virtual machine 170A may execute a guest operating system 196A and run applications 198A-B which may utilize the underlying VCPU 190A, VIVID 192A, and VI/O device 194A. One or more applications 198A-B may be running on a virtual machine 170A under the respective guest operating system 196A. A virtual machine (e.g., VM 170A-B, as illustrated in FIG. 1) may run on any type of dependent, independent, compatible, and/or incompatible applications on the underlying hardware and OS. In an example, applications (e.g., App 198A-B) run on a virtual machine 170A may be dependent on the underlying hardware and/or OS 186. In another example embodiment, applications 198A-B run on a virtual machine 170A may be independent of the underlying hardware and/or OS 186. For example, applications 198A-B run on a first virtual machine 170A may be dependent on the underlying hardware and/or OS 186 while applications (e.g., application 198C-D) run on a second virtual machine (e.g., VM 170B) are independent of the underlying hardware and/or OS 186A. Additionally, applications 198A-B run on a virtual machine 170A may be compatible with the underlying hardware and/or OS 186. In an example embodiment, applications 198A-B run on a virtual machine 170A may be incompatible with the underlying hardware and/or OS 186. For example, applications 198A-B run on one virtual machine 170A may be compatible with the underlying hardware and/or OS 186A while applications 198C-D run on another virtual machine 170B are incompatible with the underlying hardware and/or OS 186. In an example embodiment, a device may be implemented as a virtual machine (e.g., virtual machine 170A-B).

The computer system 100 may include one or more nodes 110A-B. Each node 110A-B may in turn include one or more physical processors (e.g., CPU 120A-C) communicatively coupled to memory devices (e.g., MD 130A-C) and input/output devices (e.g., I/O 140A-B). Each node 110A-B may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

In an example, consumer processor 124 and producer processor 128 may be one of the other processor(s) illustrated in FIG. 1, such as a CPU (e.g., CPU 120A-C) on node 110A-B. Similarly, ring buffer 138 may be stored in a memory device, and may be one of the other memory(s) illustrated in FIG. 1, such as MD 130A-C on node 110A-B. Additionally, consumer processor 124 and producer processor 128 may be different cores on the same physical processor. The consumer processor 124 may be configured to retrieve memory entries from the ring buffer 138 by testing values of slots to determine whether the slots contain a memory entry or an invalid value. The consumer processor 124 may also be configured to invalidate slots in batches, for example, by walking the ring buffer 138 backwards after retrieving memory entries from a threshold quantity of slots. The consumer processor 124 may invalidate a slot by overwriting the current memory entry in the slot with a "0" value. By invalidating the threshold quantity of slots in batches, the consumer processor prevents cache line bounces after each memory entry retrieval, thereby improving performance and throughput. Similarly, the consumer processor sends an invalidation message for a batch or group of slots instead of for each individual slot, thereby reducing the time and occurrences of that the consumer processor is blocked while waiting for the producer processor to receive the cache invalidation messages.

As used herein, physical processor or processor 120A-C, 124, and 128 refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors 120A-C may be interconnected using a variety of techniques, ranging from a point-to-point processor interconnect, to a system area network, such as an Ethernet-based network. Local connections within each node, including the connections between a processor 120A-C and a memory device 130A-C may be provided by one or more local buses of suitable architecture, for example, peripheral component interconnect (PCI).

Figure 2B:
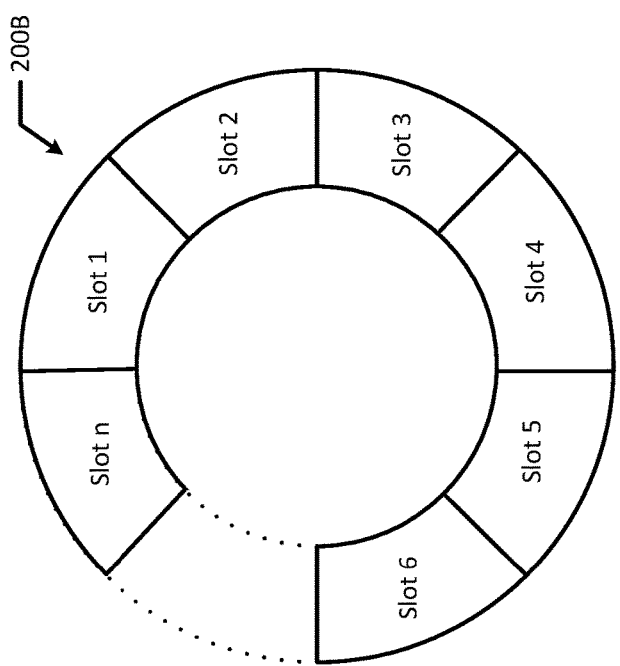
FIG. 2B illustrates a block diagram of an example memory ring according to an example embodiment of the present disclosure.

FIGS. 2A and 2B illustrate block diagrams of example ring buffers 200A and 200B. For example, FIG. 2A illustrates a linear buffer implementation of ring buffer 200A while FIG. 2B illustrates the "ring" structure of ring buffer 200B. It should be appreciated that ring buffers 200A-B may be the same actual memory structure illustrated in two different ways. Ring buffers 200A-B may in be located in cacheable memory, such as L1 cache if on the same physical processor but on different CPU cores. In another example, the ring buffer 200A-B may be on a different level of cache other than L1. Additionally, ring buffers 200A-B may include a plurality of slots (e.g., slots 210A-N). For example, slots 210A-N may correspond to Slot_1 to Slot_n respectively. Each slot may include a memory entry, such as a data packet, a packet address, or the like. Additionally, slots may be empty or may include an invalid value, such as "0". For example, a slot with a memory address of "0" or a NULL value may be used to indicate an empty slot or invalid slot. Valid slots may include a memory entry, such as a data packet or a packet address.

Figure 3:
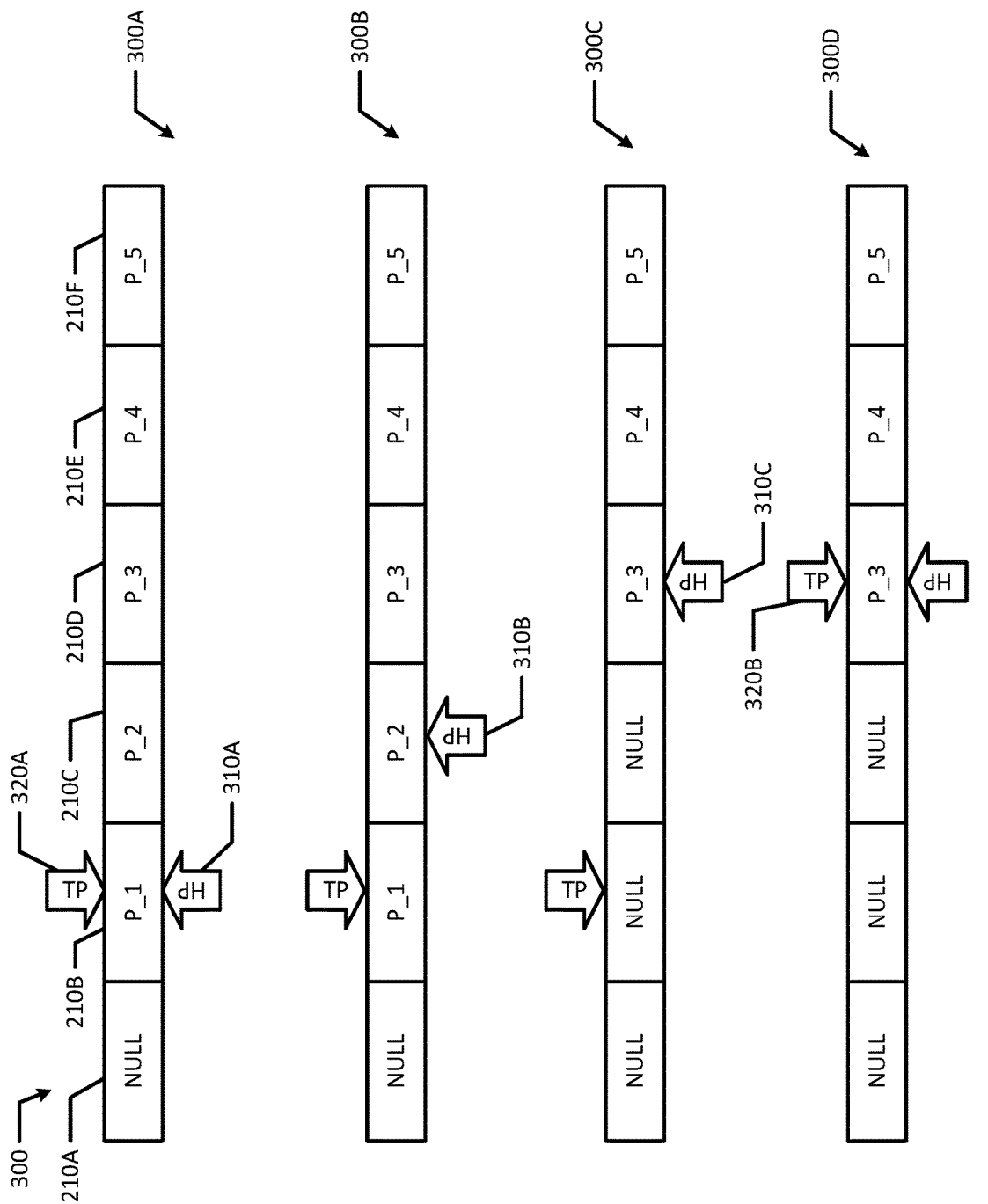
FIG. 3 illustrates a block diagram of split head invalidation for consumer batching of an example memory ring.

FIG. 3 illustrates a block diagram of split head invalidation for consumer batching of an example memory ring, such as ring buffer 138 or 200A-B. For example, memory ring 300 is illustrated as 300A-E, which represents different states of memory ring 300 at different points in time. Memory ring or ring buffer 300 may include six slots (e.g., slots 210A-F). In an example, each slot may include a memory entry, such as a packet address P_1 to P_5 or an invalid value, such as a NULL value. As illustrated in ring buffer 300A, a first slot (e.g., slot 210A) includes an invalid value, slot 210B includes packet address P_1, slot 210C includes packet address P_2, slot 210D includes packet address P_3, slot 210E includes packet address P_4, and slot 210F includes packet address P_5. Packet addresses may be written into the memory ring or ring buffer 300 by a producer processor, such as producer processor 128. Additionally, indices or pointers may indicate specific slots in ring buffer 300. For example, a head pointer 310A may designate or indicate a first slot (e.g., slot 210B). The head pointer 310A may be advanced to successive slots until reaching a threshold quantity of slots (e.g., two slots). In an example, the head pointer may be an index, such as a registry. A consumer processor 124 may retrieve memory entries, such as packet addresses from a plurality of slots (e.g., slots 210B-D) after the head pointer 310A has advanced a threshold quantity of slots (e.g., two slots). In the illustrated example, the head pointer 310A advances to a second slot (e.g., slot 210C), which is illustrated as head pointer 310B in ring buffer 300B. Additionally, the head pointer 310B may advance to a third slot (e.g., slot 210D), which is illustrated as head pointer 310C in ring buffer 300C. After retrieving the packet addresses, the consumer processor 124 may invalidate the group of slots (e.g., slots 210B-D).

As illustrated by ring buffers 300C, the consumer processor 124 may invalidate each slot between the head pointer 310C and the tail pointer 320A (e.g., from the head pointer 310C to the tail pointer 320A). For example, the consumer processor 124 may walk the ring 300 backwards and invalidate each slot from the fourth slot (e.g., slot 210D) indicated by the head pointer 310C to the second slot (e.g., slot 210B) indicated by the tail pointer 320A. As illustrated in FIG. 3, invalidating each slot between the head pointer 310C and the tail pointer 320A may include invalidating slots from the head pointer 310C up to the tail pointer 320A (e.g., slot 210C) as well as the slot indicated by the tail pointer 320A (e.g., slot 201B). For example, the consumer processor 124 may invalidate slot 210C by writing or storing a NULL value into the slot. Similarly, the consumer processor 124 may invalidate slot 210B by writing a NULL value into the slot 210B. After each slot (e.g., slot 210B-C) has been invalidated, the tail pointer 320A may be advanced to the same slot as the head pointer 310C, which is illustrated in ring buffer 300D with the tail pointer 320B and head pointer 310C positioned at slot 210D with packet address P_3. Similar to the split head invalidation for consumer batching described above for slots 210B-C, the consumer processor 124 may proceed consuming additional memory entries, such as packet addresses or data packets, from the slot currently indicated by the head pointer 310C (e.g., slot 210D) to an additional threshold quantity of slots. Once the consumer has invalidated the slots, the producer processor 128 may store additional memory entries, such as packet address P_6 into ring buffer 300. For example, the producer processor 128 may store P_6 and P_7 in slots 210A and 210B respectively after the consumer processor 124 is done accessing the cache line for slots 210A and 210B, which advantageously reduces the frequency of cache line bounces between the consumer processor 124 and producer processor 128. For example, the consumer processor 124 retrieves multiple memory entries before invalidating any of the entries, thereby holding back the producer processor 128 and advantageously preventing the frequency of cache line bounces without increasing ring size. Additionally, by invalidating groups or batches of slots, cache invalidation messages are sent to the producer processor 128 less frequently, thereby reducing the time and occurrences that the consumer processor is blocked while waiting for the producer processor 128 to receive the cache invalidation messages.

As illustrated in FIG. 3, the threshold quantity of slots is two, however, other threshold quantities may be used. For example, the threshold quantity may be three, four, ten, etc. In an example, the threshold quantity may be associated with the size of the ring buffer 138. For example, the threshold quantity may be a fraction of the size of the ring buffer 138 (e.g., 1/16 of a ring, 1/8 of a ring, or 1/4 of a ring). In an example, if the threshold quantity is 1/16 of a ring with 128 slots, then the threshold quantity may be 8 slots. Similarly, the threshold quantity may also be related to the size and or quantity of cache lines. For example, the threshold quantity may be calculated such that the threshold quantity of slots occupy an integer number of cache lines (e.g., 1, 2, 3). For example, if a slot size is 8 bytes and a cache line is 64 bytes, a threshold quantity of slots may be 8, such that the threshold quantity of slots occupies one cache line. Similarly, the threshold quantity of slots may be 16 such that the threshold quantity of slots occupies two cache lines. Additionally, the threshold quantity of slots may be related to the quantity of cache lines used by the ring buffer 138. For example, if the ring buffer 138 uses four cache lines (e.g., 32 slot ring where each slot is 8 bytes and four cache lines of 64 bytes), then the threshold quantity of slots may be the quantity of slots dedicated to a single cache line (e.g., 8 slots), which may advantageously prevent cache line bounces between the producer processor 128 and the consumer processor 124 because each processor may be accessing different cache lines. For example, after the consumer processor 124 consumes and invalidates slots in a first cache line, it may start consuming additional slots in a different cache line (e.g., second cache line) as the producer processor 128 is producing memory entries or data packets to slots in the first cache line, thereby allowing the producer processor 128 and the consumer processor 124 to simultaneously execute memory operations in separate cache lines.

Figure 4:
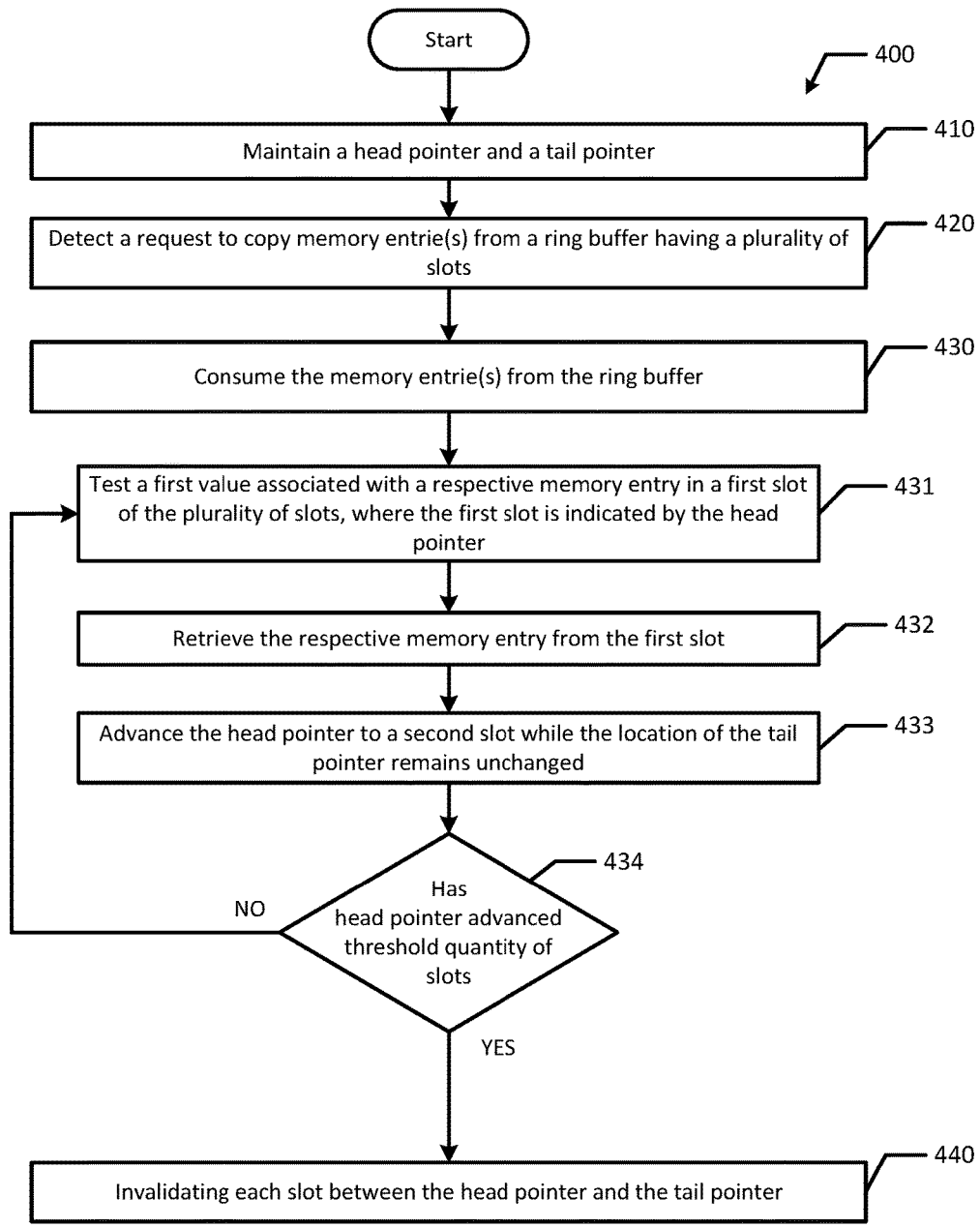
FIG. 4 illustrates a flowchart of an example process for split head invalidation for consumer batching according to an example embodiment of the present disclosure.

FIG. 4 illustrates a flowchart of an example method 400 for split head invalidation for consumer batching according to an example embodiment of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both.

The example method 400 includes maintaining a head pointer and a tail pointer (block 410). For example, a consumer processor 124 may maintain a head pointer 310 and a tail pointer 320 in memory (e.g., in the same cache line). In an example, the head pointer 310 and the tail pointer 320 are maintained in memory, which is private to the consumer processor 124 and kept separate from memory accessed by the producer processor 128. Maintaining a consumer index (e.g., head pointer 310 and/or tail pointer 320) in private memory advantageously reduces or avoids the cache line bounces inherent in standard circular buffer designs. Additionally, by using two consumer indices (e.g., head pointer 310 and tail pointer 320) in private memory, the amount of cache line bouncing may advantageously be reduced further. Then, the consumer processor may detect a request to copy at least one memory entry from a ring buffer having a plurality of slots (block 420). For example, a consumer processor 124 may detect a request to copy memory entries from a ring buffer 138 to a second memory, such as virtual machine memory 195A. In an example, the consumer processor 124 may detect a request after a producer processor 128 adds additional memory entries to the ring buffer 138. Additionally, the consumer processor 124 may detect a request from a virtual machine (e.g., VM 170A-B). Then, the consumer processor may consume the at least one memory entry from the ring buffer (block 430). For example, the consumer processor 124 may consume the memory entries from the ring buffer 138. In an example, the consumer processor 124 may consume memory entries specified by the request.

The consumer processor may test a first value associated with a respective memory entry in a first slot of the plurality of slots, where the first slot is indicated by the head pointer (block 431). For example, the consumer processor 124 may test the slot indicated by the head pointer 310 to determine if the slot includes a memory entry, such as a data packet, or to determine if the slot is empty (e.g., includes a NULL value). Then, the consumer processor may retrieve the respective memory entry from the first slot (block 432). For example, responsive to receiving a valid value from the test, the consumer processor 124 may retrieve the respective memory entry from the first slot. Then, the consumer processor may advance the head pointer 310 to a second slot, while the location of the tail pointer 320 remains unchanged (block 433). For example, the head pointer 310 and tail pointer 320 may both start at the same slot (e.g., first slot), and the consumer processor 124 may advance the head pointer 310 to the next slot (e.g., second slot) while maintaining the tail pointer 320 at the first slot. Then, the consume processor may determine whether the head pointer 310 has advanced a threshold quantity of slots (block 434). For example, the threshold quantity of slots may be two, three, or more. The consumer processor may iterate blocks 431, 432, and 433 for each successive slot that the head pointer 310 advances to until reaching the threshold quantity of slots (e.g., two, three, or more slots). In an example, the consumer processor 124 may test respective values of each successive slot while the respective value of each successive slot in the ring buffer 138 remains unchanged. Additionally, the consumer processor 124 may stop testing slots responsive to receiving an invalid value from one of the successive slots that the head pointer 310 is positioned at. Alternatively, if an invalid value is not received, the consumer processor 124 may stop testing responsive to retrieving a threshold quantity of memory entries in the ring buffer 138 corresponding to a threshold quantity of slots that the head pointer 310 indicated while advancing along the ring buffer 138.

Optionally, the consumer processor may copy the respective memory entries to a second memory. For example, the consumer processor 124 may copy the respective memory entry associated with the first slot to the second memory, such as virtual machine memory 195A. In an example, the consumer processor 124 may store the memory entries in a temporary memory location before copying the memory entries to the second memory. The consumer processor 124 may copy memory entries to the second memory in groups or batches, for example, after retrieving memory entries from a threshold quantity of slots. In another example, the consumer processor 124 may copy memory entries as they are retrieved, such that the memory entries are copied to the second memory iteratively along with the iterative testing, retrieving, and advancing described by blocks 431, 432, and 433 respectively.

In an example, the consumer processor may track a quantity of slots that the head pointer advances to. For example, the consumer processor 124 may track a quantity of slots (e.g., two, three, or more slots) that the head pointer 310 advances. In an example, the consumer processor 124 may continually track the quantity of slots that the head pointer 310 advances via a counter, such as a lot counter that is maintained by the consumer processor 124. Additionally, the consumer processor 124 may track the quantity of slots that the head pointer 310 advances by comparing the position or location of the head pointer 310 and the tail pointer 320. The consumer processor 124 may track the quantity of slots that the head pointer advances to while the consumer processor 124 is testing and retrieving memory entries from successive slots. In another example, the consumer processor 124 may track the quantity of slots at certain times or intervals (e.g., after multiple iterations of testing, retrieving, and advancing occur).

If the threshold quantity is three slots, then the consumer processor 124 may retrieve three memory entries from the ring buffer 138. If some of the slots include an invalid value, the consumer processor 124 may retrieve less than three memory entries from the ring buffer 138. For example, the consumer processor 124 may advantageously retrieve less than the threshold quantity to increase efficiency and reduce downtime associated with waiting for additional packets to be produced by the producer processor 128, which may cause undue delays when there is a slowdown of incoming network traffic. In an example, the consumer processor 124 may be paused or may wait before attempting to consume additional memory entries (e.g., the consumer processor may go to sleep before being woken up later to consume additional packets). For example, after testing a slot and receiving or reading an invalid value (e.g., NULL value), a timer may start and count up to a predetermined timespan (e.g., 25 milliseconds, one second, 20 seconds) before the consumer processor 124 attempts to consume additional memory entries. In another example, the consumer processor 124 may pause after testing a slot with an invalid value until it receives an additional request to copy memory entries from the producer processor 128.

Then, the consumer processor may invalidate each slot between the head pointer and the tail pointer (block 440). For example, the consumer processor 124 may invalidate each slot between the head pointer 310 and the tail pointer 320, for example, by overwriting the contents of the slot with an invalid value. Invalidating slots between the head pointer 310 and the tail pointer 320 may include overwriting the memory entry in each slot behind the head pointer 310 up to and including the slot indicated by the tail pointer 320. Additionally, the head pointer 310 may be advanced after invaliding each of the slots. For example, invaliding slots between the head pointer 310 and the tail pointer 320 may include invalidating the slots from the head pointer 310 up to the tail pointer 320 along with both slots indicated by the head pointer 310 and tail pointer 320 respectively. In an example, the consumer processor 124 may successively walk the ring buffer 138 backwards from the head pointer 310 (e.g., slot indicated by head pointer 310) to the tail pointer (e.g., slot indicated by the tail pointer 320). In an example, walking the ring buffer 138 backwards may include decrementing a counter, such as slot counter, while walking backwards. For example, the consumer processor 124 may decrement the slot counter for each slot that the consumer processor 124 walks back to determine when it reaches the tail pointer 320. Invalidating slots between the head pointer 310 and the tail pointer 320 may be done in any order.

Invaliding each slot between the head pointer 310 to the tail pointer 320 may result in invalidating slots between the head pointer 310 and the tail pointer 320 and the slot indicated by the tail pointer 320. For example, referring back to FIG. 3, invalidating each slot between the head pointer 310C and the tail pointer 320A may result in invalidating slots 210B-C (e.g., slots behind the slot indicated by head pointer 310C). In an example, multiple invalidation steps may occur iteratively after advancing the head pointer 310 a threshold quantity of slots or reading an invalid value in a slot. For example, multiple invalidation steps may occur to first invalidate slots 210C and then to invalidate slot 210B. In an example, invalidating each slot may include overwriting each slot with an invalid value. For example, invalidating a slot may include storing a NULL value, such as a "0" value in the slot.

By invalidating each slot in a batch all together instead of after each retrieval, the producer processor 128 is advantageously held back from accessing the ring buffer 138 (e.g., cache line associated with slot in the ring buffer 138), which reduces the frequency and/or occurrence of a cache line bounce. Additionally, by consuming and invalidating a threshold quantity of slots (e.g., two or more slots), cache line invalidation messages are sent to the producer processor 128 less often, which advantageously reduces the frequency that the consumer processor 124 is blocked while waiting for each of these cache line invalidation messages to be received. For example, depending on the threshold quantity used and the ring size, the producer processor 128 and consumer processor 124 may be accessing slots that are far enough away from each other (e.g., in different cache lines) that neither is accessing the same cache line at the same time. For example, a cache line may be 64 bytes, and a slot may be 8 bytes, thus a ring buffer 138 may take up multiple cache lines. If the producer processor 128 and the consumer processor 124 are producing and consuming memory entries in slots that are positioned more than 8 slots away from each other in the above example, the producer processor 128 and the consumer processor 124 may be utilizing different cache lines. Accordingly, in this example, the threshold quantity may be 8 or more so the respective cache lines used by the producer processor 128 and the consumer processor 124 may not overlap thereby avoiding or minimizing cache line bounces.

After the original slot is invalidated, a cache line may bounce between the consumer processor 124 and the producer processor 128. For example, while the consumer processor 124 is accessing the ring buffer 138, the consumer processor 124 may access the cache line for the ring buffer 138. However, when the producer processor 128 needs to access the memory for the ring buffer 138, the producer processor 128 may request access to the cache line to determine the current state of the ring buffer 138 (e.g., what memory entries are present in the ring buffer 138), thereby causing a cache line bounce which may slow down the process of forwarding network traffic (e.g., data packets). In an example, a cache line may be 64 bytes wide. When either the consumer processor 124 or producer processor 128 needs to read or write a location in the ring buffer 138, the consumer processor 124 and/or producer processor 128 may check for a corresponding entry in the cache. For example, the cache may check for the contents of the requested memory location (e.g., ring slot) in any cache lines that may contain the address.

Figure 5A:
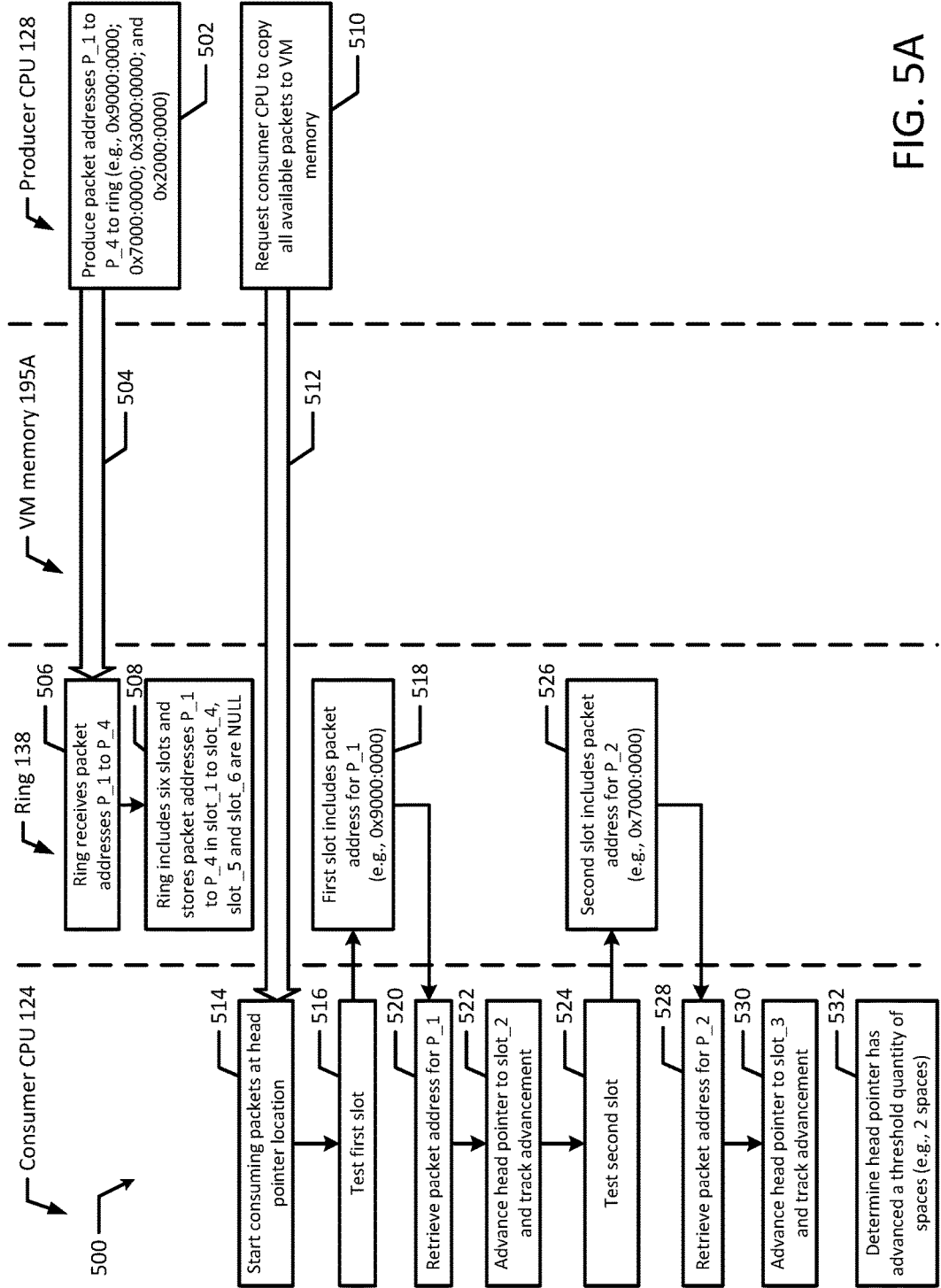
FIGS. 5A, 5B, and 5C illustrate a flow diagram of an example process for split head invalidation for consumer batching in pointer rings according to an example embodiment of the present disclosure.
Figure 5B:
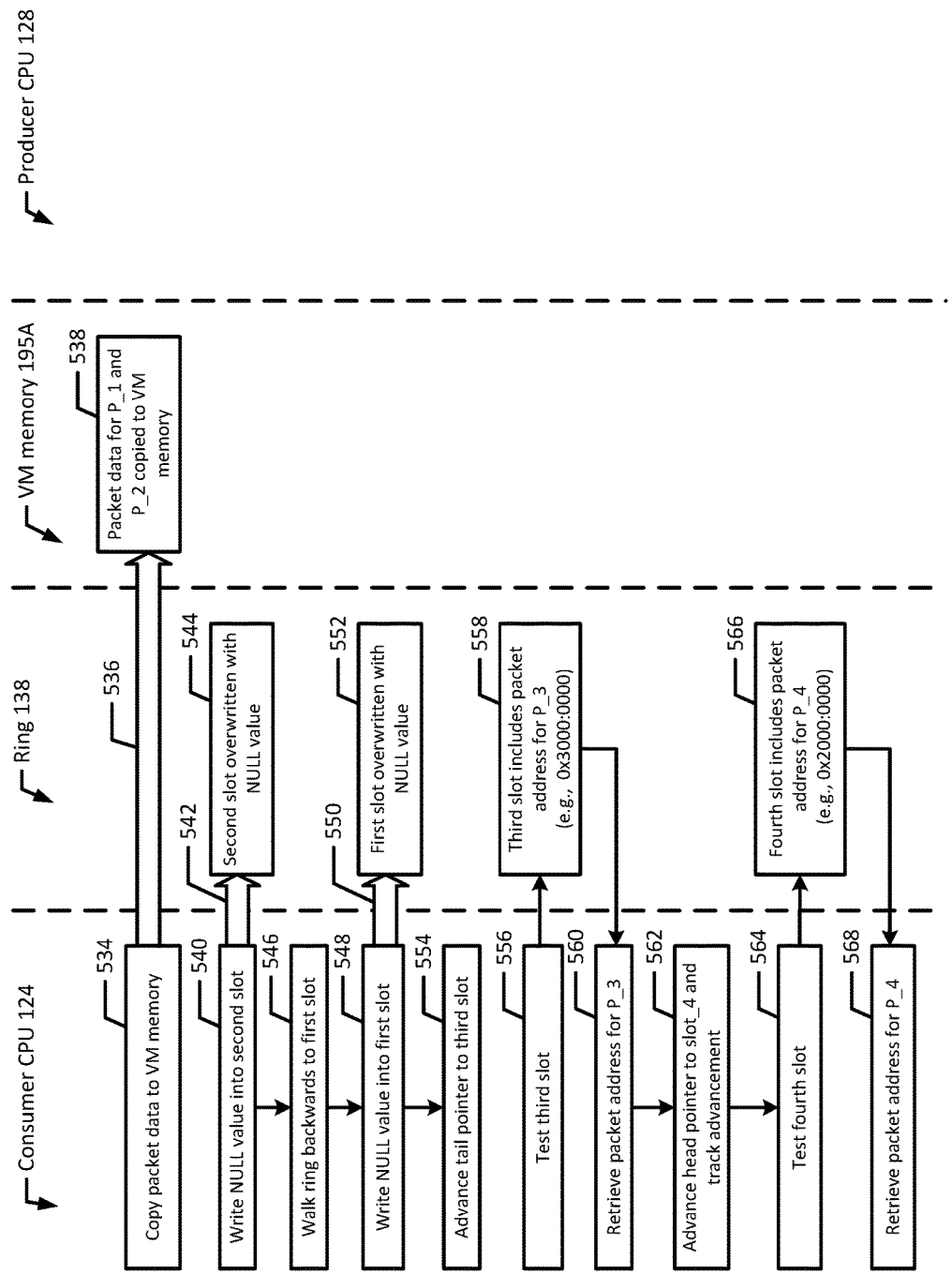
Figure 5C:
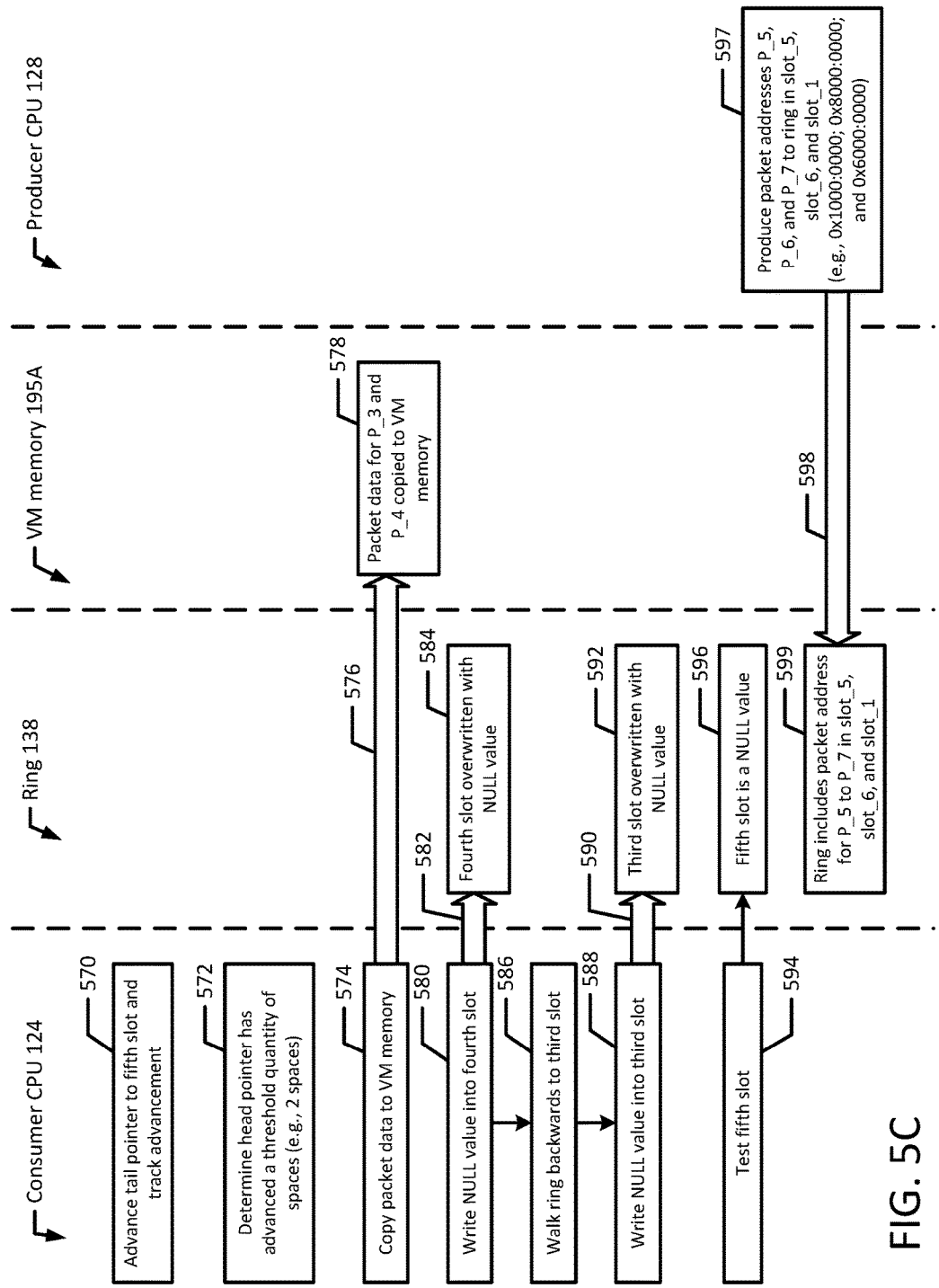

FIGS. 5A, 5B, and 5C illustrate a flowchart of an example method 500 for split head invalidation for consumer batching in pointer rings in accordance with an example embodiment of the present disclosure. Although the example method 500 is described with reference to the flowchart illustrated in FIGS. 5A, 5B, and 5C it will be appreciated that many other methods of performing the acts associated with the method 500 may be used. For example, the order of some of the blocks may be changed, certain blocks may be combined with other blocks, and some of the blocks described are optional. For example, a consumer processor 124 (e.g., consumer CPU) and a producer processor 128 (e.g., producer CPU) may communicate with a ring buffer 138 and virtual machine memory 195A to perform example method 500.

In the illustrated example, the producer CPU 128 may produce packet addresses P_1 to P_4 to ring buffer 138 (blocks 502 and 504). For example, the producer CPU may produce packet addresses 0.x9000:0000, 0x7000:0000, 0x3000:0000, and 0x2000:0000 corresponding to packet address P_1 to P_4 in four slots in the ring buffer 138 (e.g., first slot to fourth slot). Then, the ring buffer or ring 138 receives packet addresses P_1 to P_4 (block 506). For example, packet addresses P_1 to P_4 may be written in the ring buffer 138. In an example, packet addresses P_1 to P_4 may be stored in the ring buffer 138 by writing the packet address into the slot (e.g., replacing NULL value with packet address). In the illustrated example, the ring buffer 138 includes six slots and stores packet addresses P_1 to P_4 in slot_1 to slot_4 while slot_5 and slot_6 are NULL (block 508). In an example, a memory address of "0" may represent a NULL value.

Then, the producer CPU 128 may request the consumer CPU 124 to copy all available packets to VM memory 195A (blocks 510 and 512). For example, the producer CPU 128 may forward incoming network traffic to a virtual machine (e.g., VM 170A) by producing packet addresses for the incoming network traffic to the ring buffer 138 and requesting the consumer CPU 124 to copy the available packets (via the packet addresses) from the ring buffer 138 to VM memory 195A. The consumer CPU may start consuming packets at the head pointer 310 location (block 514). In an example, the consumer CPU 124 may start consuming packets (e.g., packet addresses) after receiving the request from the producer CPU 128. Additionally, the consumer CPU 124 may detect the request.

The consumer CPU 128 may test the first slot (block 516). For example, the consumer CPU 128 may test slot_1 to determine the value of the memory entry or packet address in the slot. In the illustrated example, the first slot includes a packet address for P_1 (e.g., 0x9000:0000) (block 518). For example, the consumer CPU 124 may read slot_1 while testing the first slot to determine that the first slot includes a packet address of 0x9000:0000. Then, the consumer CPU 124 may retrieve the packet address for P_1 (block 520). In an example, the consumer CPU 124 may store the packet address for P_1 in a temporary memory location before copying the associated packet to VM memory 195A.

After retrieving the packet address in the first slot, the consumer CPU 124 may advance the head pointer 310 to the second slot (e.g., slot_2) and track advancement (block 522). In an example, the consumer CPU 124 may track advancement by comparing the position of the head pointer 310 to the tail pointer 320. In another example, the consumer CPU 124 may implement a counter to track advancement of the head pointer 310. Then, the consumer CPU may test the second slot (block 524). For example, the consumer CPU 128 may test slot_2 to determine the value of the memory entry or packet address in the slot. In the illustrated example, the second slot includes a packet address for P_2 (e.g., 0x7000:0000) (block 526). For example, the consumer CPU 124 may read slot_2 while testing the second slot to determine that the second slot includes a packet address of 0x7000:0000. Then, the consumer CPU 124 may retrieve the packet address for P_2 (block 528). Similar to P_1, the packet address for P_2 may also be stored in a temporary memory location.

After retrieving the packet address for P_2, the consumer CPU 124 may advance the head pointer 310 to the third slot (e.g., slot_3) and track advancement of the head pointer 310 (block 530). Since the location of the tail pointer 320 has remained unchanged, the consumer CPU 124 may track advancement of the head pointer by comparing the position of the head pointer 310 (e.g., positioned at slot_3) to the position of tail pointer 320 (e.g., positioned at slot_1) to determine that the head pointer 310 has advanced two slots. Then, the consumer CPU 124 may determine that the head pointer 310 has advanced a threshold quantity of spaces or slots (block 532). For example, in the illustrated example, the threshold quantity of spaces or slots is two slots.

Then, as illustrated in FIG. 5B, the consumer CPU 124 may copy packet data to VM memory 195A (blocks 534 and 536). For example, the consumer CPU 124 may copy the data packets associated with the packet addresses P_1 and P_2 to VM memory 195A. In an example, the packet data may be copied to VM memory 195A from a temporary memory location. Then, packet data for P_1 and P_2 is copied to VM memory 195A (block 538). In an example, packet data for P_1 and P_2 may be copied to VM memory 195A in a batch. Additionally, packet data for P_1 and P_2 may be copied to VM memory 195A sequentially as each packet address is retrieved by the consumer CPU 124. For example, packet data may be copied to VM memory 195A before the head pointer 310 advances to the next slot.

After retrieving packet addresses from a threshold quantity of slots in the ring buffer 138, the consumer CPU 124 may write or store a NULL value into the second slot (blocks 540 and 542). For example, the consumer CPU 124 may walk the ring buffer 138 backwards from slot_3 to slot_1 and may invalidate slot_2 and slot_1 sequentially. Then, the second slot (e.g., slot_2) is overwritten with a NULL value (block 544). For example, slot_2 in the ring buffer 138 is invalidated, which enables it to be used by the producer CPU 128 in the future for additional network traffic data packets. After invalidating the second slot, the consumer CPU 124 may walk the ring buffer 138 backwards to the first slot (block 546). For example, the consumer CPU 124 may execute a walk function to walk the ring buffer 138. Then, the consumer CPU 124 may write or store a NULL value into the first slot (blocks 548 and 550). In an example, a memory address of "0" may represent a NULL value. The second slot is overwritten with a NULL value (block 552). For example, slot_1 in the ring buffer 138 is invalidated, which enables slot_1 to be used by the producer CPU 128 for additional network traffic data packets. Invaliding the slots in batches or groups advantageously improves performance and throughput without increasing ring size, especially when a driver is highly optimized and copying is slower than receiving packets. After invalidating the first slot, the consumer CPU 124 may advance the tail pointer to the third slot (block 554). For example, the consumer CPU 124 may advance the tail pointer 320 to the same location as the head pointer 310. With the head pointer 310 and the tail pointer 320 located at the same slot, the consumer CPU 124 may track future advancement of the head pointer 310 to determine when the next threshold quantity of slots has been reached.

The consumer CPU 124 may test the third slot (block 556). For example, the consumer CPU 128 may test slot_3 to determine the value of the memory entry or packet address in the slot. In the illustrated example, the third slot includes a packet address for P_3 (e.g., 0x3000:0000) (block 558). For example, the consumer CPU 124 may read slot_3 while testing the third slot to determine that the third slot includes a packet address of 0x3000:0000. Then, the consumer CPU 124 may retrieve the packet address for P_3 (block 560). As discussed above, the packet address (e.g., packet address for P_3) may be stored in a temporary memory location by the consumer. After retrieving the packet address from the third slot, the consumer CPU 124 may advance the head pointer 310 to slot_4 and track advancement of the head pointer 310. Since the location of the tail pointer 320 was previously changed to the third slot (e.g., slot_3), the consumer CPU 124 may track advancement of the head pointer by comparing the position of the head pointer 310 (e.g., positioned at slot_4) to the position of tail pointer 320 (e.g., positioned at slot_3) to determine that the head pointer 310 has advanced one slot.

Then, the consumer CPU 124 may test the fourth slot (block 564). For example, the consumer CPU 128 may test slot_4 to determine the value of the memory entry or packet address in the slot. In the illustrated example, the fourth slot includes a packet address for P_4 (e.g., 0x2000:0000) (block 566). For example, the consumer CPU 124 may read slot_4 while testing the fourth slot to determine that the fourth slot includes a packet address of 0x2000:0000. Then, the consumer CPU 124 may retrieve the packet address for P_4 (block 568). In an example, the consumer CPU 124 may store the packet address for P_4 in a temporary memory location. In another example, the consumer CPU 124 may copy each packet to VM memory 195A immediately after retrieval.

As illustrated in FIG. 5C, after retrieving the packet address for P_4, the consumer CPU 124 may advance the head pointer 310 to the fifth slot (e.g., slot_5) and track advancement of the head pointer 310 (block 570). For example, the consumer CPU 124 may determine that the head pointer 310 has advanced two slots (e.g., from slot_3 to slot_5). Then, the consumer CPU 124 may determine that the head pointer 310 has advanced a threshold quantity of spaces or slots (block 572). For example, in the illustrated example, the threshold quantity of spaces or slots is two slots. In an example, the threshold quantity of slots may be four, five, ten, or more slots. Additionally, the threshold quantity of slots may be associated with the size of the ring buffer 138 and/or the size of a cache line.

Then, the consumer CPU 124 may copy packet data to VM memory 195A (blocks 574 and 576). For example, the consumer CPU 124 may copy the data packets associated with the packet addresses P_3 and P_4 to VM memory 195A. In an example, the packet data may be copied to VM memory 195A from a temporary memory location. Then, packet data for P_3 and P_4 is copied to VM memory 195A (block 578). In an example, packet data for P_3 and P_4 may be copied to VM memory 195A in a batch. Additionally, packet data for P_3 and P_4 may be copied to VM memory 195A sequentially as each packet address is retrieved by the consumer CPU 124. For example, packet data may be copied to VM memory 195A before the head pointer 310 advances to the next slot.

After retrieving packet addresses from a threshold quantity of slots in the ring buffer 138, the consumer CPU 124 may write or store a NULL value into the fourth slot (blocks 580 and 582). For example, the consumer CPU 124 may walk the ring buffer 138 backwards from slot_5 to slot_3 and may invalidate slot_4 and slot_3 sequentially. Then, the fourth slot (e.g., slot_4) is overwritten with a NULL value (block 584). For example, slot_4 in the ring buffer 138 is invalidated, which enables it to be used by the producer CPU 128 in the future for additional network traffic data packets. After invalidating the fourth slot, the consumer CPU 124 may walk the ring buffer 138 backwards to the third slot (block 586). For example, the consumer CPU 124 may execute a walk function to walk the ring buffer 138. Then, the consumer CPU 124 may write or store a NULL value into the third slot (blocks 588 and 590). In an example, a memory address of "0" may represent a NULL value. The third slot is overwritten with a NULL value (block 592). For example, slot_3 in the ring buffer 138 is invalidated, which enables slot_3 to be used by the producer CPU 128 for additional network traffic data packets.

After invalidating the third slot, the consumer CPU 124 may advance the tail pointer to the fifth slot (block 592). For example, the consumer CPU 124 may advance the tail pointer 320 to the same location as the head pointer 310. With the head pointer 310 and the tail pointer 320 located at the same slot (e.g., slot_5), the consumer CPU 124 may track future advancement of the head pointer 310 to determine when the next threshold quantity of slots has been reached. Then, the consumer CPU 124 may test the fifth slot (block 594). For example, the consumer CPU 128 may test slot_5 to determine the value of the memory entry or packet address in the slot. In the illustrated example, the fifth slot includes a NULL value or "0" value (block 596). For example, the consumer CPU 124 may read slot_5 while testing the fifth slot to determine that the fifth slot includes a packet address of "0". Upon receiving a NULL value, the consumer CPU 124 may stop testing slots. For example, a NULL value may indicate that the remainder of the ring buffer 138 is empty and that there are currently no additional packets to copy to VM memory 195. In an example, the consumer processor 124 may be paused or may wait before attempting to consume additional memory entries. For example, after testing a slot and receiving or reading a NULL value, a timer may start and count up to a predetermined timespan (e.g., 25 milliseconds, one second, 20 seconds) before the consumer processor 124 attempts to consume additional memory entries. In another example, the consumer processor 124 may pause after testing a slot with a NULL value until it receives an additional request to copy memory entries from the producer processor 128.

At a later time, the producer CPU 128 may produce packets to empty or invalid slots. In the illustrated example, the producer CPU 128 may produce packet addresses P_5, P_6, and P_7 to ring buffer 138 (blocks 597 and 598). For example, the producer CPU may produce packet addresses 0.x1000:0000, 0x8000:0000, and 0x6000:0000 corresponding to packet address P_5 to P_7 in three slots in the ring buffer 138 (e.g., slot_5, slot_6, and slot_1). Then, the ring buffer or ring 138 receives packet addresses P_5 to P_7 and the ring 138 includes six slots and stores packet addresses P_5 to P_7 in slot_5, slot_6, and slot_1 respectively while slot_1 to slot_4 are NULL (block 599). By previously invalidating slot_1, the consumer CPU 124 advantageously made the slot available for packet P_7. After producing additional packet addresses to the ring 138, the producer CPU 128 may send additional requests to the consumer CPU 124 to copy available packets to VM memory 195A.

Figure 6:
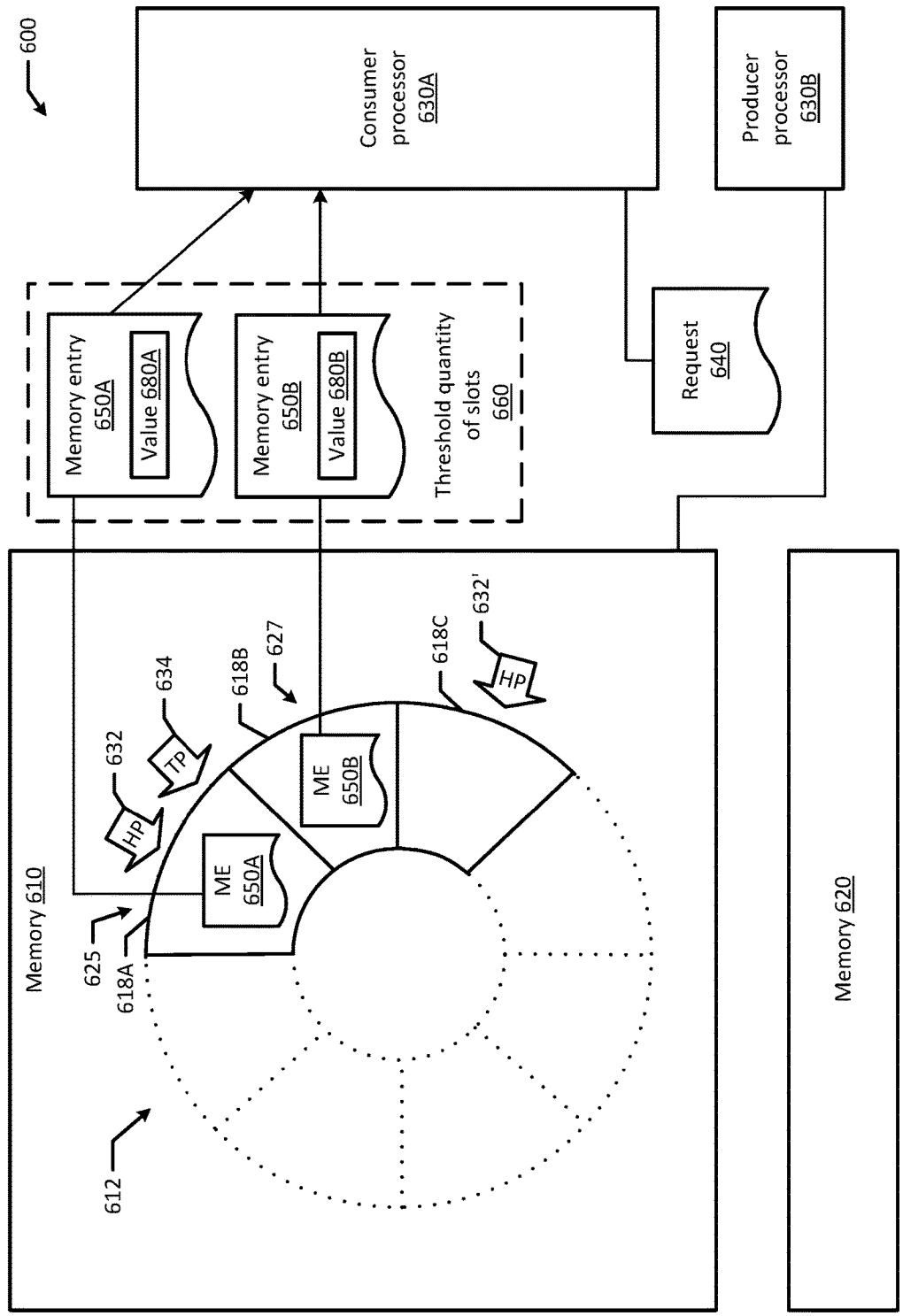
FIG. 6 illustrates a block diagram of an example split head invalidation system according to an example embodiment of the present disclosure.

FIG. 6 is a block diagram of an example split head invalidation system 600 according to an example embodiment of the present disclosure. The split head invalidation system 600 includes a first memory 610 including a ring buffer 612 having a plurality of slots 618A-C. The ring buffer 612 may have any appropriate number of slots, which may vary depending on application. The reverse slot invalidation system 600 may also include a second memory 620 and at least one processor 630A-B in communication with the first memory 610. The at least one processor 630A-B includes a consumer processor 630A and a producer processor 630B. The consumer processor 630A may be configured to maintain a head pointer 632 and a tail pointer 634, detect a request 640 to copy at least one memory entry (e.g., memory entries 650A-B) from the ring buffer 612 to the second memory 620, and consume the at least one memory entry (e.g., memory entries 650A-B) from the ring buffer 612. Consuming memory entries may include testing a respective value (values 680A-B) associated with a respective memory entry (e.g., memory entries 650A-B) in a first slot 625 (e.g., slot 618A), where the first slot 625 is indicated by the head pointer 632. Additionally, the consumer processor 630A may test a respective memory entry (e.g., memory entry 650A) from the first slot 625 (e.g., slot 618A) responsive to receiving a valid value from the test. The consumer processor 630A may also include advancing the head pointer 632 to a second slot 627 while the location of the tail pointer 634 remains unchanged. Testing respective values, retrieving respective memory entries, and advancing the head pointer may be iterated or repeated for each successive slot that the head pointer advances to until reaching a threshold quantity of slots 660 (e.g., 2 slots). Responsive to the quantity of slots (e.g., 2 slots) reaching the threshold quantity of slots 660 (e.g., 2 slots), the consumer processor 630A may be configured to invalidate each slot between the head pointer 632' and the tail pointer 634.

Instead of a cache line constantly bouncing between the producer processor 630B and consumer processor 630A, the consumer processor 630A advantageously retrieves and invalidates multiple memory entries 650 from a threshold quantity (e.g., 2, 3, 8, 16) of slots 618 at a time, thereby allowing multiple memory entry operations before the cache line bounces to the producer processor 630B, which improves performance and throughput without increasing the size of the ring buffer 612.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a first memory including a ring buffer having a plurality of slots;
a second memory; and
at least one processor in communication with the first memory, wherein the at least one processor includes a consumer processor and a producer processor, and the consumer processor is configured to:
maintain a head pointer and a tail pointer,
detect a request to copy at least one memory entry from the ring buffer to the second memory,
consume the at least one memory entry from the ring buffer, including:
(i) test a respective value associated with a respective memory entry in a first slot of the plurality of slots, wherein the first slot is indicated by the head pointer,
(ii) responsive to receiving a valid value from the test, retrieve the respective memory entry from the first slot,
(iii) advance the head pointer to a second slot while the location of the tail pointer remains unchanged, and
(iv) iterating (i), (ii), and (iii) for each successive slot that the head pointer advances to until reaching a threshold quantity of slots, and
responsive to a quantity of slots reaching the threshold quantity of slots, invalidate each slot between the head pointer and the tail pointer.

2. The system of claim 1, wherein the consumer processor is configured to advance the tail pointer to the location of the head pointer after invalidating each slot between the head pointer and the tail pointer.

3. The system of claim 1, wherein the head pointer and the tail pointer are maintained in the same cache line.

4. The system of claim 1, wherein the head pointer and the tail pointer are indices.

5. The system of claim 1, wherein the threshold quantity of slots occupy an integer number of cache lines.

6. The system of claim 1, wherein the head pointer and the tail pointer start at the same slot.

7. The system of claim 1, further comprising a counter, wherein the consumer processor is configured to track the quantity of slots with the counter.

8. The system of claim 1, wherein the consumer processor compares the location of the head pointer and the tail pointer to track the quantity of slots that the head pointer advances.

9. The system of claim 1, wherein the consumer processor and the producer processor are on different cores of the same physical processor.

10. The system of claim 1, wherein the consumer processor and the producer processor are different physical processors.

11. The system of claim 1, wherein the at least one memory entry is at least one packet address and the second memory is a virtual machine memory.

12. A method comprising:
- maintaining, by a consumer processor, a head pointer and a tail pointer;
- detecting, by a consumer processor, a request to copy at least one memory entry from a ring buffer having a plurality of slots;
- consuming, by the consumer processor, the at least one memory entry from the ring buffer, including:
  - (i) testing, by the consumer processor, a first value associated with a respective memory entry in a first slot of the plurality of slots, wherein the first slot is indicated by the head pointer,
  - (ii) responsive to receiving a valid value from the test, retrieve, by the consumer processor, the respective memory entry from the first slot,
  - (iii) advancing, by the consumer processor, the head pointer to a second slot while the location of the tail pointer remains unchanged, and
  - (iv) iterating, by the consumer processor, (i), (ii), and (iii) for each successive slot that the head pointer advances to until reaching a threshold quantity of slots; and
- responsive to a quantity of slots reaching the threshold quantity of slots, invalidating, by the consumer processor, each slot between the head pointer and the tail pointer.

13. The method of claim 12, further comprising tracking, by the consumer processor, the quantity of slots the head pointer advances to, wherein tracking the quantity of slots used includes comparing the head pointer and the tail pointer.

14. The method of claim 12, further comprising copying, by the consumer processor, the respective memory entries to a second memory.

15. The method of claim 12, further comprising advancing, by the consumer processor, the tail pointer to the location of the head pointer.

16. The method of claim 12, wherein the head pointer and the tail pointer are maintained in the same cache line in the memory.

17. The method of claim 12, wherein the consumer processor detects a request from one of the virtual machine and the producer processor.

18. The method of claim 12, wherein invalidating each slot between the head pointer and the tail pointer includes invalidating each slot behind a third slot indicated by the head pointer to the first slot indicated by the tail pointer, which includes invalidating the first slot indicated by the tail pointer.

19. The method of claim 12, wherein the consumer processor advances the head pointer to a third slot and the consumer processor invalidates the second slot and the first slot, wherein the first slot, the second slot, and the third slot are successive slots in the ring buffer.

20. A non-transitory machine-readable medium storing code, which when executed by a consumer processor, is configured to:
- maintain a head pointer and a tail pointer;
- detect a request to copy a at least one memory entry from a ring buffer having a plurality of slots;
- consume the at least one memory entry from the ring buffer, including:
  - (i) test a first value associated with a respective memory entry in a first slot of the plurality of slots, wherein the first slot is indicated by the head pointer,
  - (ii) responsive to receiving a valid value from the test, retrieve the respective memory entry from the first slot,
  - (iii) advance the head pointer to a second slot while the location of the tail pointer remains unchanged, and
  - (iv) iterate (i), (ii), and (iii) for each successive slot that the head pointer advances to until reaching a threshold quantity of slots; and
- responsive to the quantity of slots reaching the threshold quantity of slots, invalidate each slot between the head pointer and the tail pointer.

* * * * *